United States Patent [19]

Huignard

[11] Patent Number: 4,491,867
[45] Date of Patent: Jan. 1, 1985

[54] DEVICE FOR THE HETERODYNE DETECTION OF AN OPTICAL IMAGE

[75] Inventor: Jean-Pierre Huignard, Paris, France

[73] Assignee: Thomson-CSF, Paris, France

[21] Appl. No.: 421,776

[22] Filed: Sep. 23, 1982

[30] Foreign Application Priority Data

Dec. 7, 1981 [FR] France .............................. 81 22852

[51] Int. Cl.³ .............................................. H01N 5/30
[52] U.S. Cl. ..................................... 358/113; 358/209; 358/212
[58] Field of Search .................. 358/209, 213, 113, 89, 358/226, 227, 212, 205, 214; 350/6.1

[56] References Cited

U.S. PATENT DOCUMENTS

| | | | |
|---|---|---|---|
| 3,571,507 | 3/1971 | Korpel | 178/7.1 |
| 3,699,245 | 10/1972 | Scott | 178/6 |
| 3,772,457 | 11/1973 | Macovski | 178/6.8 |
| 4,152,725 | 5/1979 | Beckman | 358/109 |

FOREIGN PATENT DOCUMENTS 0040116  11/1981  France .............................. 358/113

OTHER PUBLICATIONS

Optics Communications, vol. 38, No. 4, Apr. 15, 1981, North Holl. Publ. Co., Amsterdam, J. P. Huignard et al., pp. 249-254.

*Primary Examiner*—Stafford D. Schreyer
*Assistant Examiner*—Robert G. Lev
*Attorney, Agent, or Firm*—Oblon, Fisher, Spivak, McClelland & Maier

[57] ABSTRACT

A device for the heterodyne detection of the image of targets illuminated by a laser, wherein the target reflects a wave $\Sigma_1$, which is amplified in an included refractive index variation medium also illuminated by a reference wave $\Sigma_R$ derived from the laser to produce an amplified wave $\Sigma_2$. A portion of the wave $\Sigma_1$ prior to amplification is directed incident on a frequency shifter to produce frequency shifted wavefront $\Sigma_{10}$. Wavefront $\Sigma_2$ and the frequency-shifted wavefront $\Sigma_{10}$ are directed incident on the same partially reflection mirror to interfere with one another and the resultant beat interference wave is focused on a matrix of photodetectors and then filtered. This device has application to infrared image detection.

8 Claims, 3 Drawing Figures

DEVICE FOR THE HETERODYNE DETECTION OF AN OPTICAL IMAGE

BACKGROUND OF THE INVENTION

1. Field of the Invention

The present invention relates to the heterodyne detection of the optical image of targets in an area illuminated by a laser. The invention more specifically applies to the detection of an image in the infrared range by a mosaic of photodetectors.

2. Description of the Prior Art

It is known that the signal-to-noise ratio (S/N ratio) of infrared detectors is generally limited by the thermal noise and dark current. In the case of such detectors it is not possible in direct detection to reach the value limited by the shot noise for the S/N ratio. However, it is known that this limit ratio can be reached by superimposing on the wave front received from the illuminated objects, a coherent wave of a sufficient intensity and which is supplied by the laser used for illumination purposes.

If the frequency $F_L$ corresponding to this reference wave is the same as the frequency $F_S$ used for the illumination, we have a homodyne detection. If the frequencies $F_L$ and $F_S$ differ, the detection is heterodyne and the electric detection signal is modulated to the beat frequency $f = F_L - F_S$.

Heterodyne detection has the advantage compared with homodyne detection of eliminating low frequency noise by filtering around frequency f. Homodyne and heterodyne detectors have the disadvantage of only being usable for a small angle observation field typically of approximately $10^{-4}$ radians.

Moreover, it is known, particularly from the article by J. P. Huignard and A. Marrakchi in "Optics Communications", vol. 38, 1981, p. 249 to amplify a wave front in photorefractive crystals such as $Bi_{12}SiO_{20}$ (B.S.O.) by a mixture of two waves.

BRIEF SUMMARY OF THE INVENTION

The present invention obviates the disadvantage of heterodyne detection by the simultaneous use of an amplified signal wave front and a frequency-shifted signal wave front. As a result heterodyne image detection is possible in a large angular field.

The present invention therefore relates to a device for the heterodyne detection of the optical image of targets illuminated by a laser on a mosaic of photodetectors, wherein the wavefront $\Sigma_1$ diffused by the targets is incident on an induced refractive index variation medium (C), which is also illuminated by a plane wave $\Sigma_R$ obtained from the beam supplied by the laser. The wavefront $\Sigma_1$ is amplified in the medium (C), which supplies an amplified wavefront $\Sigma_2$. Wavefront $\Sigma_2$ interferes with a wavefront $\Sigma_{10}$ obtained by frequency shift from wavefront $\Sigma_1$, and a lens focuses the wavefront $\Sigma_2$ and $\Sigma_{10}$ onto a matrix of photodetectors. Signals supplied by the photodetectors are filtered by filters centered on the beat frequency f.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
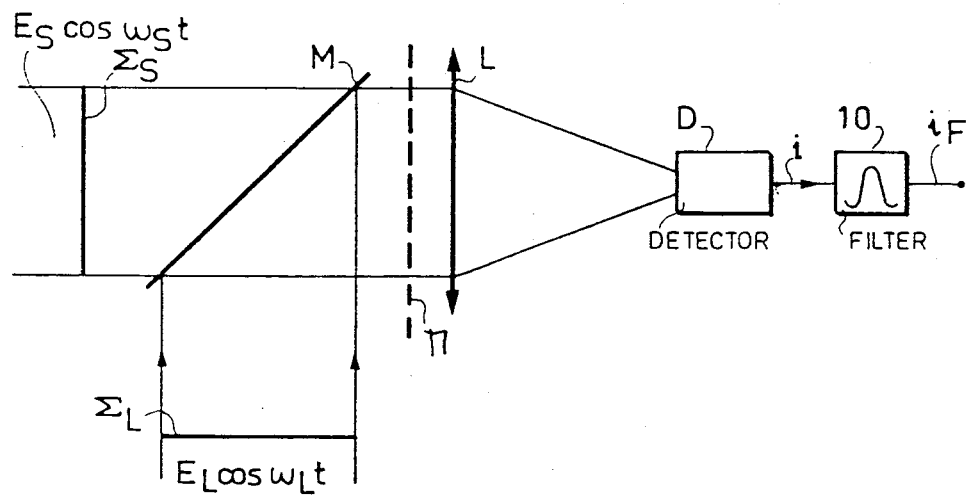
FIG. 1 is a schematic diagram illustrating the optical heterodyning diagram according to the prior art.

The basic diagram of a heterodyne detection applied to the optical field is shown in FIG. 1. In principle, the device must have a local oscillator coherent with the optical signal to be detected, because the local oscillator and signal are at slightly different frequencies $F_L$ and $F_S$. The variation of the frequencies $f = F_L - F_S$ is small compared with the frequencies $F_L$ and $F_S$.

In FIG. 1 it is assumed that the signal and reference wavefronts $\Sigma_S$ and $\Sigma_L$ are planar and rendered parallel by a semitransparent mirror m. Following focusing by a lens L, the two waves are received by the square-law detector D.

The current i supplied by detector D is proportional by a constant factor K to the mean value in a long time period, i.e., long when compared with the optical periods, of the sum of the squares of the electric fields of the two waves $e_S$ and $e_L$, as follows:

$$i = K|e_S + e_L|^2 \qquad (1)$$

where $$e_s = E_S \cos(\omega_S t + \phi_S) \qquad (2)$$

$$e_L = E_L \cos(\omega_L t + \phi_L)$$

and $\omega_S = 2\pi F_S$ and $\omega_L = 2\pi F_2$, and phase constants $\phi_L$, $\phi_S$ are phases defined relative to a plane $\pi$ parallel to waves $E_S$ and $E_L$. The detected signal i is filtered by a filter 10 centered on frequency f, and the filtered signal $i_F$ is in the form:

$$i_F = K \cos(2\pi f + \phi_L - \phi_S)$$

In the imaging or infrared detection field ($\lambda > 1 \mu m$), detectors exist, whose detectivities remain reduced and where the predominant causes of noise are the dark current and thermal noise. However, the use of a heterodyne detection ensures a S/N ratio corresponding to the shot noise of the incident signal of power $P_S$. Provided the power $P_L$ of the local oscillator is such that $P_L >> P_S$, we have in this case:

$$(S/N) = (\eta/\Delta f)(P_S/hF_S) \qquad (3)$$

In (3) h is the Planck's constant, $\eta$ the quantum efficiency of the detector and $\Delta f$ the pass band of filter 10. If power $P_L$ is not sufficient for equation (3) to apply, the $S/N_h$ ratio is such that:

$$(S/N)_h = (S/N)_d P_L/P_S \qquad (4)$$

in which $(S/N)_d$ is the signal-to-noise ratio for a direct detection.

Moreover, filter 10 eliminates slow fluctuations if f is sufficiently high.

If the two wave fronts $\Sigma_S$ and $\Sigma_I$, after reflection on the semitransparent mirror, form an angle $\Delta\theta$, the phase differences in the plane vary spatially and equation (3) can only be applied if $$\Delta\theta < \lambda/2R \tag{5}$$

in which $\lambda$ is the wave length and R the radius of lens L.

On assuming a lens diameter of 10 cm and a wave length of 10 $\mu$m, equation (5) shows that the field observable by heterodyne detection is less than $10^{-4}$ radians, which severely limits bidimensional imaging.

According to the invention, the intrinsic advantages of heterodyne detection are retained, whilst ensuring a large angular field compatible with the formation of the image detected, in parallel on a matrix of photodetectors.

Figure 2:
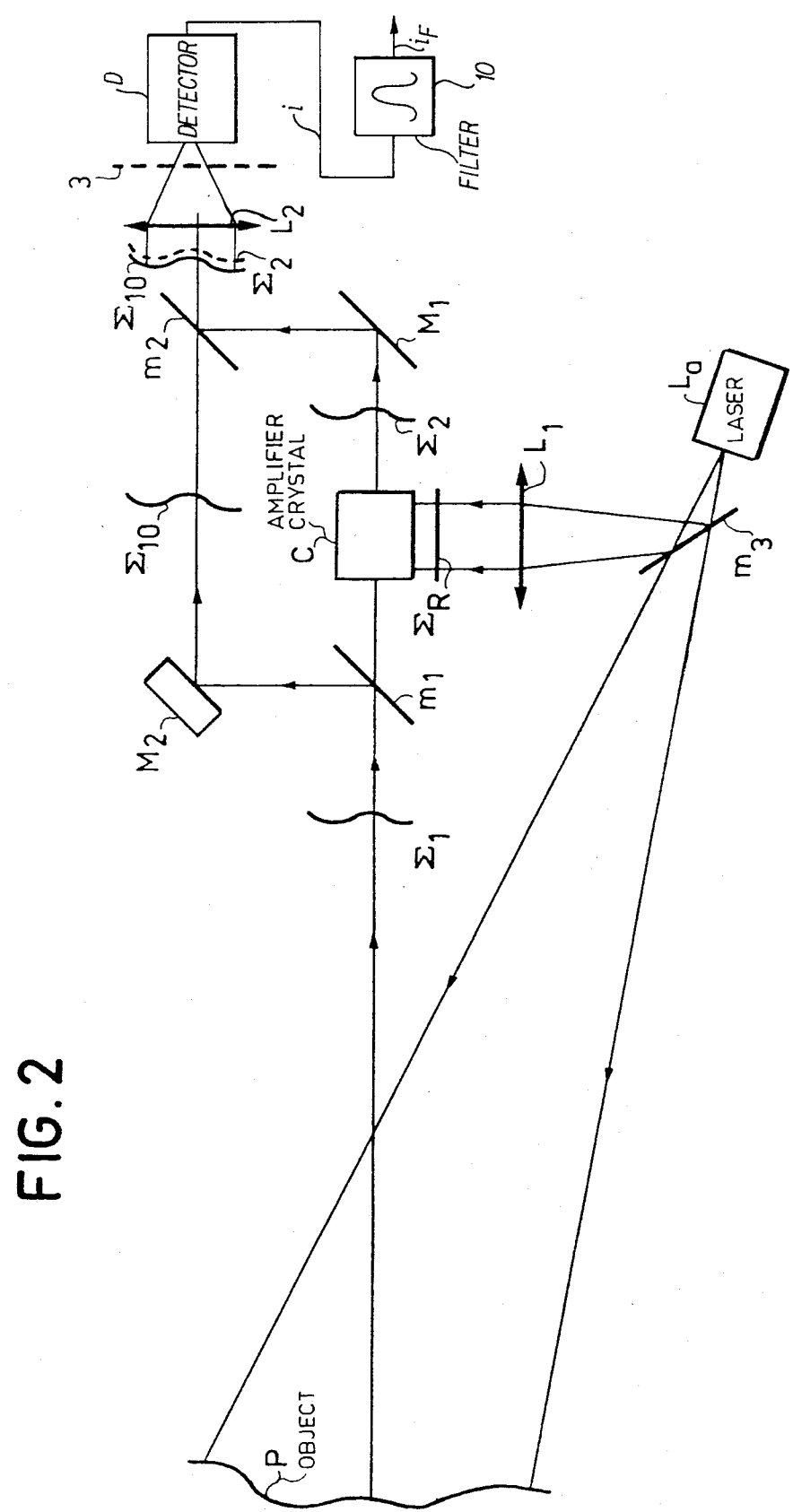
FIG. 2 is a schematic diagram illustrating the optical heterodyning according to the invention.

FIG. 2 shows the diagram of the heterodyning device according to the invention. A laser $L_a$ illuminates an object P, which reflects a wave front $\Sigma_1$. A semitransparent mirror $m_1$ permits the passage of part of $\Sigma_1$, which is then incident on the amplifying crystal C. Crystal C is also illuminated by a plane reference wave $\Sigma_R$. The reference beam is furnished by a semitransparent mirror $M_3$ which reflects a portion of the beam from laser $L_a$. A lens $L_1$ supplies the plane wave $\Sigma_R$.

The interaction between reference wave $\Sigma_R$ and the signal wave $\Sigma_1$ having traversed the semitransparent mirror, has the effect of supplying at the outlet of crystal C an amplified wave $\Sigma_2$, identical, to within the amplification factor, to the signal wave $\Sigma_1$. The wave reflected by the semitransparent mirror $M_1$ is reflected by a mirror $M_2$. The latter is mounted, for example, on a piezoelectric device, to which is applied a sawtooth voltage. This has the effect of changing the frequency of the wavefront reflected by mirror $M_2$.

It is also possible to change the frequency by introducing an acoustic deflector on the beam reflected by the partly reflecting mirror $m_1$.

The frequency-shifted wave front $\Sigma_{10}$ and the amplified wave front $\Sigma_2$, interfere with one another after reflection on mirror $M_1$ and the semi-transparent mirror $m_2$. A lens $L_2$ forms the interferential image on a matrix of photodetectors 3.

Heterodyning, without angular limitation, is permitted by the superimposing of identical wave fronts, one being frequency-displaced and the other amplified.

Figure 3:
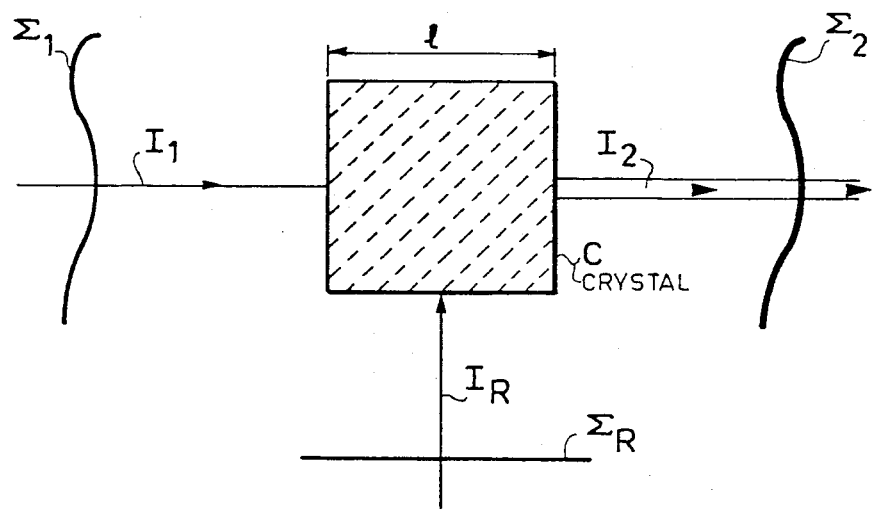
FIG. 3 is a schematic diagram illustrating the optical amplification by an induced refractive index variation medium.

The real time amplification methods for a complex wave front are based on the instantaneous recording of a volume hologram functioning by photoinduced index variation. The amplification results from the auto-diffraction of the reference wave $\Sigma_R$ in the dynamic phase grating (FIG. 3).

It has been shown in the aforementioned document by J. P. Huignard and A. Marrakchi that under these conditions the intensity of the wave transmitted by the interaction medium can be written in the form:

$$I_2 = I_1 \frac{(1 + \beta)\exp(\Gamma - \alpha)l}{\beta + \exp(\Gamma l)} \tag{6}$$

in which $\beta = I_R/I_S$ and $I_1$, $I_2$ and $I_R$ are respectively the intensities of waves $\Sigma_1$, $\Sigma_2$ and the reference wave $\Sigma_R$, $l$ is the length of the crystal, $\alpha$ its absorption coefficient and $\Gamma$ the gain, which is given by the expression:

$$\Gamma = (4\pi\Delta n_S)/\lambda \cos\Psi \tag{7}$$

in which $\Delta n_S$ is the variation at saturation and $\Psi$ the angle between the waves $\Sigma_1$ and $\Sigma_R$.

If $\beta$ is very large, equation (6) is simplified and becomes:

$$I_2 = I_1 \exp(\Gamma - \alpha) \tag{8}$$

From equation (6) it is possible to find the value $l_o$ of l, which gives the maximum amplification as follows:

$$l_o = \log_e[\beta(\Gamma/\alpha - 1)] \tag{9}$$

For information purposes, the following numerical values are assumed:
refractive index at saturation, $\Delta n_S = 10^{-4}$,
absorption coefficient, $\alpha = 2$ cm$^{-1}$,
angle between wave fronts in the medium, $\cos\Psi \simeq 1$,
reference intensity ratio on signal $\beta = 10^9$.

It is found on the basis of equations (7) and (9) that:

$$\Gamma = 12 \text{ cm}^{-1} \text{ and } l_o = 10 \text{ mm}$$

so that on the basis of equation (8), $$I_2/I_1 = 2 \times 10^4$$

As a function of the wavelengths, it is possible to utilize index variations photoinduced by the following physical effects:
optical Kerr effect, e.g. in $CS_2$,
saturated absorption in gases (Na vapor, $SF_6$, etc.),
excitation in semiconductors (Si, Ge, CdS ...),
photorefractive effect (BSO, $LiNbO_3$, $BaTiO_3$ etc),
thermal effects.

On certain media, particulaly the B.S.O. crystai, it is known that to obtain a high amplification, a phase displacement is necessary between the reference wave and the index variation grating which can be brought about, e.g., by displacing the crystal or the interference bands.

Finally, a device has been described permitting the superheterodyne detection on a bidimensional infrared image without angular limitation. The image can be detected in parallel by a mosaic of photodetectors.

This heterodyne detection is maintained even if the incident wave front is disturbed by fluctuations of the phase, provided that the time constants used remain high compared with the inscription time $\sigma_H$ of the hologram. As a function of the materials $\tau_H$ varies between $10^{-12}$ and $10^{-3}$ second.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A heterodyne detection device for the heterodyne detection of an optical image reflected off a target illuminated by beams emitted from a laser, comprising:
    an induced refractive index variation medium (C) adapted to be illuminated by a first portion of a wavefront $\Sigma_1$ reflected by said target and a portion of a plane wavefront obtained from the beams emitted by said laser, wherein said wavefront $\Sigma_1$ is amplified in said medium (C) into an amplified wavefront $\Sigma_2$;

means for frequency shifting a second portion of said wavefront $\Sigma_1$ to produce a frequency shift wavefront $\Sigma_{10}$;

a matrix of photodetectors;

interference means having incident thereon said wavefront $\Sigma_2$ and said wavefront $\Sigma_{10}$ for producing heterodyne signals at a beat frequency between the frequencies of said wavefronts $\Sigma_1$ and $\Sigma_{10}$ and for focusing said heterodyne signals on said matrix of photodetectors for detection thereby, said matrix of photodetectors producing detected heterodyne signals; and filter means coupled to said matrix of photodetectors for filtering said detected heterodyne signals in a band including said beat frequency.

2. A heterodyne detection device according to claim 1, comprising:

a first partially reflecting mirror for separating said wavefront $\Sigma_1$ into said first and second portions, wherein said first portion is directed incident on said medium (C) and said second portion is directed incident on said frequency shifting means;

said interference means comprising a second partially reflecting mirror having incident thereon said wavefronts $\Sigma_2$ and $\Sigma_{10}$ for producing an interference wavefront based on interference between said wavefronts $\Sigma_2$ and $\Sigma_{10}$, and a lens for focusing said interference wavefront on said matrix of photodetectors.

3. A heterodyne detection device according to claim 2, wherein said frequency shifting means comprises:

a mirror mounted on a piezoelectric device to which is applied a periodic sawtooth voltage.

4. A heterodyne detection device according to claim 2, wherein said frequency shifting means comprises:

an acoustic reflector.

5. A heterodyne detection device according to claim 1, wherein the induced refractive index variation medium (C) is photorefractive.

6. A heterodyne detection device according to claim 1, wherein the induced refraction index variation medium (C) utilizes the optical Kerr effect.

7. A heterodyne detection device according to claim 1, wherein the induced refractive index variation medium comprises a gas being in a state of saturated absorption.

8. A heterodyne detection device according to claim 1, wherein the induced refractive index variation medium (C) comprises a semiconductor medium.

* * * * *